Sept. 4, 1956 P. F. T. C. STILLWELL 2,761,919
NON-LINEAR AUTOMATIC CONTRAST CONTROL
CIRCUIT FOR VIDEO AMPLIFIER
Filed Nov. 27, 1951

Inventor
PETER FREDERIC THOMAS CRYER STILLWELL
By Ralph E. Atherton
Attorney

United States Patent Office 2,761,919

Patented Sept. 4, 1956

2,761,919

NON-LINEAR AUTOMATIC CONTRAST CONTROL CIRCUIT FOR VIDEO AMPLIFIER

Peter Frederic Thomas Cryer Stillwell, Haddenham, Aylesbury, England, assignor to Electric & Musical Industries Limited, Hayes, England, a British company Application November 27, 1951, Serial No. 258,463

Claims priority, application Great Britain December 6, 1950

2 Claims. (Cl. 179—171)

Figures 1, 2:
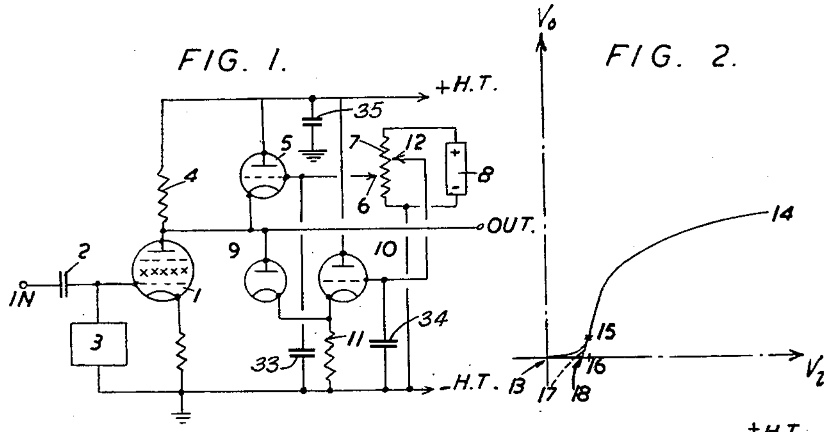

This invention relates to non-linear electrical circuits and it relates especially to so-called "gamma" circuits for television apparatus.

In the vision signal channel of television transmitting equipment there is usually provided a so-called gamma circuit for modifying the contrast of the video signals. It is usually desirable to reduce the contrast and this involves reducing the ratio of the level of signals representing bright parts of the picture to that of signals representing dark parts of the picture. To obtain such a reduction in contrast, the gamma circuit is required to have a gain which increases as the instantaneous level of the applied signals decreases from white level towards black level. A gamma circuit with such a characteristic has, however, a disadvantage due to the fact that agitation noise signals are inevitably mixed with the video signals. Such noise signals are A. C. signals and in a portion of signal which would otherwise represent black cause potential excursions to occur into the grey region of signal levels. Moreover, such noise signals are considerably expanded by a gamma circuit whose gain, as aforesaid, is a maximum at black level and are objectionably obvious in pictures reproduced from the signals after their contrast has been modified in such a circuit. They appear as light spots throughout black parts of the picture, and by reducing the contrast vitiate to some extent the effect of the gamma circuit in improving the contrast. Such noise signals are of course also present at other signal levels but they are not expended to such an extent by the gamma circuit and in any case are far less obvious in reproduced pictures since they produce their effect in lighter parts of the picture.

Similar difficulty may be encountered in other nonlinear circuits having a characteristic whose gain is greatest for signals of low level.

The object of the present invention is to reduce the difficulty referred to.

According to the present invention there is provided in a system for transmitting electrical signals representative of a light image, a non-linear circuit for modifying the contrast of the image signals, said circuit comprising a thermionic valve having an input electrode and an output electrode, a source of image signals which contain their D. C. component so that image signals received from said source representative of a particular light value have a uniform level, said source being connected to said input electrode, an output load connected to said output electrode and including a non-linear impedance for producing a progressive increase in the impedance of said load in response to a change in the image signals from white level towards black level, a normally non-conducting unilaterally conductive path connected in parallel with said impedance, and means for biassing said unilaterally conductive path for conduction in response to image signals in the range from a predetermined grey level to black level to reduce the gain of said circuit for image signals in said range, said biassing means comprising a second thermionic valve having an anode, a control electrode and a cathode, a resistance in the cathode lead of said second valve, means for applying a D. C. potential to said control electrode and said anode, and a bias-applying connection from said cathode to said unilaterally conductive path.

In order that the said invention may be clearly understood and readily carried into effect, the same will now be more fully described with reference to the accompanying drawing, in which Figure 1 illustrates a non-linear circuit according to one example of the present invention, Figure 2 is an idealised illustration of the characteristic obtained from Figure 1, and Figures 3 to 5 illustrate other examples of non-linear circuits according to the present invention.

Referring to the drawing, the circuit illustrated in Figure 1 is a gamma circuit for television transmitting apparatus. It comprises an amplifying valve 1 and it will be assumed that television video signals are applied to the control electrode of this valve, via a condenser 2, with such polarity that an increase in picture brightness is represented by an increase in potential at the control electrode. The input circuit of the valve 1 also includes a black level clamping device 3 which is shown merely in block form and may be of any convenient construction, for example, such as described in United States Patent No. 2,190,753. As explained in the last-mentioned specification the action of the device 3 is to adjust the D. C. level of the video signals by reference to minima in the video signals so that signals representative of black are stabilised at a uniform potential level, apart from the undesirable action of noise signals above referred to. The valve 1 has an anode load resistance 4 which is shunted by a thermionic valve 5 having a control electrode which is taken to a tapping 6 on a potentiometer 7 connected across a source of bias potential indicated conventionally at 8. The cathode of the valve 5 is connected to the anode of the valve 1 and it is also connected to the anode of a diode valve 9 whose cathode is connected to the cathode of a further valve 10, the cathode of the last-mentioned valve being in turn connected to ground by a large resistance 11. The valve 10 has its anode connected to the high tension line and has a control electrode which is taken to another tapping 12 on potentiometer 7 located at a point of higher potential than tapping 6. The output of the circuit is taken from the anode of the valve 1. The anodes and control electrodes of the valves 5 and 10 are, in known manner, decoupled to ground for alternating current such decoupling being represented symbolically in the drawing by the condensers 35, 33 and 34.

In operation of the circuit, the valve 5 which is adjusted to operate on a non-linear part of its characteristic, constitutes a non-linear resistance shunting the resistance 4, and as the level of the signals applied to the control electrode of the valve 1 falls representing a decrease in picture brightness from white the resistance of the valve 5 increases and increases the gain of the valve 1, provided the diode valve 9 is non-conducting. The signals are, of course, reversed in polarity at the anode of the valve 1 compared with the control electrode thereof. The cathode of the diode valve 9 is biased at the potential of the cathode of the valve 10, which in turn is determined by the position of the tapping 12, and the bias is arranged so that the diode valve 9 remains non-conducting until the signal level at the anode of the valve 1 rises to a value corresponding to a fall at the control electrode of the valve 1 to grey level near to black level. At this level the valve 5 is in a state of low conductivity and consequently of high resistance, and the gain of the valve 1 is high but as the diode valve 9 becomes conducting the resistance 4 and the valve 5 are shunted by the diode valve 9 in series with the cathode resistance of the valve 10 which is of low value. The gain of the valve 1 is therefore reduced relatively abruptly and it remains at a low value for levels of applied signal down to black.

The effect described is illustrated by the characteristic shown in Figure 2 in which the abscissae represent the potential level of input signals ($V_i$) applied to the control electrode of the valve 1 while the ordinates represent (not necessarily on the same scale) the potential level of output signals ($V_o$) obtained from the anode of the valve 1, the origin 13 representing black level for both $V_i$ and $V_o$. Between the points 14 and 15 on the characteristic the diode valve 9 is non-conducting and in this region the slope of the characteristic increases progressively as the signal level decreases the slope being of course representative of the gain of the circuit. The level of input signals at which the diode valve 9 begins to conduct is represented by point 16 which is the abscissa of the point 15 so that between the point 15 and the origin the slope of the characteristic is relatively low. The potential level of the point 16 may, for instance, be arranged just to exceed the peak level of agitation noise in the circuit and as a result of the low slope of the characteristic below the point 15 undesirable expansion of agitation noise signals in the black regions is reduced. If the diode valve 9 were omitted the characteristic of the circuit illustrated would continue below the point 15 as indicated by the dotted line 17 to a maximum at an origin at 18.

Figure 3:
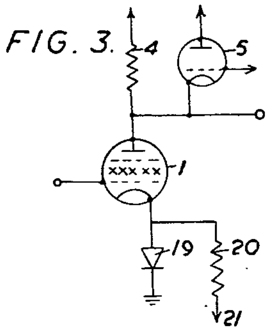

Figure 3 illustrates a modification of Figure 1 and corresponding parts in these two figures are indicated by the same reference numerals. The diode valve 9 is replaced in Figure 3 by a non-linear device, a germanium crystal 19 in this example, connected in the cathode lead of the valve 1. The crystal 19 is shunted by a large resistance 20 which is taken to a point of considerable negative potential indicated at 21. The characteristic obtained with this circuit is similar to that illustrated in Figure 2 and for signals whose level is greater than 16, the germanium crystal remains conducting, effectively short-circuiting the resistance 20 which therefore has negligible effect on the operation of the circuit. When, however, the signal level falls below the level 16 the crystal 19 changes to a condition of high impedance and its shunting action on the resistance 20 is reduced. The resistance 20 then provides a large amount of negative feedback to the input circuit of the valve 1 and the gain of the valve is reduced according to the slope of the characteristic between the points 15 and 13 in Figure 2.

Figure 4:
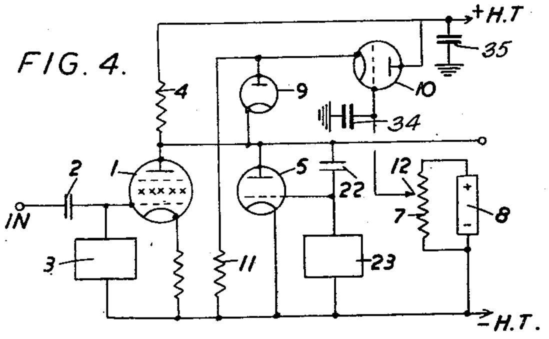

Figure 4 illustrates another modification of Figure 1 and in this modification the valve 5 is so arranged that the impedance which is in effect connected across the resistance 4 is the anode impedance of the valve 5, and not the cathode impedance of the valve 5 as in the case of in Figure 1. In order to change the resistance of the valve 5 in the desired sense in dependence upon the level of the applied signals, feedback is provided via the condenser 22 from the anode of the valve 5 to its control electrode. The control electrode circuit of the valve 5 also includes a black level clamping device 23 similar to the device 3, to reinsert the D. C. component which is lost in transmission of the negative feedback signals through the condenser 22. To obtain, with the modification illustrated in Figure 4, a characteristic corresponding to that illustrated in Figure 2, the video signals are applied to the control electrode of the valve 1 with polarity reversed compared with Figure 1, so that an increase in the picture brightness is represented by a decrease in potential. Likewise the diode valve 9 is reversed compared with Figure 1 but apart from the changes involved by the reversal of polarities and valves the operation of the circuit in Figure 4 is similar to that described with reference to Figure 1.

Figure 5:
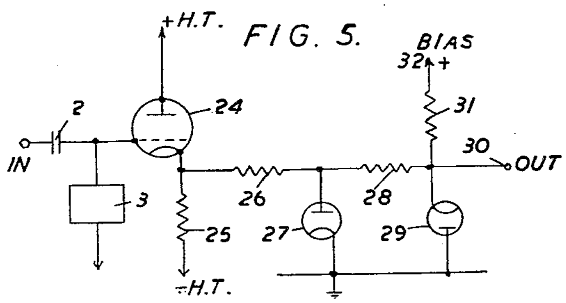

Figure 5 illustrates an application of the present invention to another form of gamma circuit. This circuit comprises a valve 24 which has a resistance 25 in its cathode lead of such value as to cause the valve 24 to operate as a cathode follower. The video signals are applied to the control electrode of the valve 24 with such polarity that an increase in picture brightness is represented by an increase in potential. It will be assumed, moreover, that the level of the signals is clamped in such manner that picture black is represented by a potential of a few volts negative (say −3 volts) at the cathode of the valve 24. The cathode resistance 25 is shunted by the series combination of a resistance 26 and a diode 27, which latter has its anode connected to the low potential end of resistance 26 and has its cathode grounded. The diode 27 is in turn shunted by the series combination of a resistance 28 and the diode valve 29 which is reversed with reference to the valve 27 so that its cathode is connected to the low potential end of resistance 28 and its anode is grounded. The output from the circuit is taken from the junction of 28 and 29 by means of the lead 30 and the cathode of the valve 29 is taken by means of a large resistance 31 to a source of positive bias potential as indicated by the arrow 32.

In operation of the circuit illustrated in Figure 5 the cathode of the valve 24 operates as a low impedance source of the video signals and it will be assumed that the potential level of the signals at the cathode of the valve 24 is initially high, representing a white signal, and that the diode valve 27 is fully conducting. Under this condition the valve 29 remains non-conducting and as the signal level at the cathode of the valve 24 falls the diode valve 27 gradually changes to a higher resistance state causing the output of the circuit to vary substantially in accordance with the slope of the curve between the points 14 and 15 in Figure 2, the bias applied to the diode 29, being such as to maintain this valve non-conducting over this range of signal levels. However, as the signal level falls below that represented by the point 16 in Figure 2, the diode 29 changes to a conducting state and produces a large attenuation. The slope of the characteristic is therefore reduced in accordance with the part of the characteristic between the points 15 and 13 in Figure 2. Inasmuch as the diode 29 is separate from the cathode of the valve 24 by two series resistances 26 and 28, which may for example each be of 1,000 ohms, whereas the valve 27 is separate only by a single resistance, the action of the diode valve 29 is sharper than that of the valve 27, and consequently it is possible to achieve a change in slope of the characteristic such as occurs at the point 15 in Figure 2.

What I claim is:

1. In a system for transmitting electrical signals representative of a light image, a non-linear circuit for modifying the contrast of the image signals, said circuit comprising a thermionic valve having an input electrode and an output electrode, a source of image signals which contain their D. C. component so that image signals received from said source representative of a particular light value have a uniform level, said source being connected to said input electrode, an output load connected to said output electrode and including a non-linear impedance for producing a progressive increase in the impedance of said load in response to a change in the image signals from white level towards black level, a normally non-conducting unilaterally conductive path connected in parallel with said impedance, and means for biasing said unilaterally conductive path for conduction in response to image signals in the range from a predetermined grey level to black level to reduce the gain of said circuit for image signals in said range, said biassing means comprising a second thermionic valve having an anode, a control electrode and a cathode, a resistance in the cathode lead of said second valve, means for applying a D. C. potential to said control electrode and said anode, and a bias-applying connection from said cathode to said unilaterally conductive path.

2. In a system for transmitting electrical signals representative of a light image, a non-linear circuit for modifying the contrast of image signals, said circuit comprising a thermionic valve having an input electrode and an output electrode, a source of image signals which contain their D. C. components so that image signals received from said source and corresponding to a particular light value have a uniform level, said source being connected to said input electrode, a second thermionic valve having at least an anode electrode and a cathode electrode and having its anode-to-cathode path connected to operate non-linearly in the circuit of said output electrode, said second valve being connected to constitute a load impedance for said first valve of increasing value in response to a change in the image signals from white level towards black level, a normally non-conducting unilaterally conductive path connected in parallel with the anode-to-cathode path of said second valve, and means for biassing said path for conduction in response to image signals in a range from a predetermined grey level to black level, to reduce the gain of said circuit, said biassing means comprising a third thermionic valve having an anode, a control electrode and a cathode, a resistance in the cathode lead of said third valve, means for applying D. C. potentials to said control electrode and said anode, and a bias-applying connection from said cathode to said unilaterally conductive path.

References Cited in the file of this patent

UNITED STATES PATENTS

| | | |
|---|---|---|
| 2,188,068 | Tringham | Jan. 23, 1940 |
| 2,190,753 | Browne et al. | Feb. 20, 1940 |
| 2,222,933 | Blumlein | Nov. 26, 1940 |
| 2,295,410 | Kreuzer | Sept. 8, 1942 |
| 2,338,412 | Dallos | Jan. 4, 1944 |
| 2,509,987 | Newman | May 30, 1950 |
| 2,519,238 | Duke et al. | Aug. 15, 1950 |
| 2,552,588 | Reeves | May 15, 1951 |
| 2,583,345 | Schade | Jan. 22, 1952 |

FOREIGN PATENTS

| | | |
|---|---|---|
| 542,820 | Great Britain | Jan. 20, 1942 |